(12) United States Patent
Levine

(10) Patent No.: US 11,639,746 B2
(45) Date of Patent: May 2, 2023

(54) SUNLESS PLANETARY GEAR AND METHOD FOR USE

(71) Applicant: Gabrael T. Levine, Palo Alto, CA (US)

(72) Inventor: Gabrael T. Levine, Palo Alto, CA (US)

(*) Notice: Subject to any disclaimer, the term of this patent is extended or adjusted under 35 U.S.C. 154(b) by 0 days.

(21) Appl. No.: 17/086,091

(22) Filed: Oct. 30, 2020

(65) Prior Publication Data

US 2021/0293308 A1  Sep. 23, 2021

Related U.S. Application Data

(60) Provisional application No. 62/927,699, filed on Oct. 30, 2019.

(51) Int. Cl.
*F16H 57/08* (2006.01)
*F16H 1/28* (2006.01)
*F16H 55/17* (2006.01)
*F16H 57/02* (2012.01)
*F16H 13/06* (2006.01)

(52) U.S. Cl.
CPC ............. *F16H 1/28* (2013.01); *F16H 13/06* (2013.01); *F16H 55/17* (2013.01); *F16H 57/02* (2013.01); *F16H 57/08* (2013.01); *F16H 1/2854* (2013.01); *F16H 2001/2881* (2013.01); *F16H 2057/02034* (2013.01)

(58) Field of Classification Search
CPC . F16H 1/28; F16H 13/06; F16H 55/17; F16H 57/02; F16H 57/08; F16H 2001/2881; F16H 2057/02034; F16H 49/005; F16H 1/2854

See application file for complete search history.

(56) References Cited

U.S. PATENT DOCUMENTS

| | | | | |
|---|---|---|---|---|
| 301,234 | A | * 7/1884 | Healy | F16H 1/2854 475/349 |
| 1,392,567 | A | * 10/1921 | Horine | F16H 1/2854 475/332 |
| 1,563,945 | A | * 12/1925 | Apple | H02K 7/116 310/83 |
| 3,988,949 | A | 11/1976 | Weseloh et al. | |
| 4,994,004 | A | * 2/1991 | Meijer | F01B 3/106 475/149 |
| 5,293,107 | A | * 3/1994 | Akeel | B25J 9/08 310/83 |
| 5,704,864 | A | * 1/1998 | Yanagisawa | F16H 1/28 475/149 |
| 5,711,736 | A | * 1/1998 | Kyodo | F16H 13/06 475/149 |

(Continued)

FOREIGN PATENT DOCUMENTS

| | | | |
|---|---|---|---|
| CN | 110094483 A | * 8/2019 | |
| DE | 19721646 C1 | * 4/1998 | .......... B25J 19/0062 |

(Continued)

*Primary Examiner* — Sherry L Estremsky
(74) *Attorney, Agent, or Firm* — Levine Bagade Han LLP

(57) ABSTRACT

A gearbox is disclosed. The gearbox can have planetary gears. Each planetary gear can revolve around a rotational center of itself while concurrently revolving around a rotational center of the gear system as a whole. The gearbox can be used to deliver rotational output energy at a right (or other angle) from the direction of a received input energy.

8 Claims, 22 Drawing Sheets

(56) References Cited

U.S. PATENT DOCUMENTS

| | | | |
|---|---|---|---|
| 6,031,308 A | | 2/2000 | Kinoshita et al. |
| 6,080,077 A | * | 6/2000 | Kamlukin ................. B60K 1/00 |
| | | | 180/372 |
| 7,815,535 B2 | * | 10/2010 | Ai ............................ F16H 1/28 |
| | | | 475/149 |
| 7,886,858 B2 | | 2/2011 | Ai |
| 9,850,616 B2 | * | 12/2017 | Liu ......................... D06F 37/30 |
| 10,250,101 B2 | * | 4/2019 | Brassitos ................. F16H 1/28 |
| 2009/0233754 A1 | * | 9/2009 | Pedersen .................. F16H 3/66 |
| | | | 475/296 |
| 2018/0051775 A1 | | 2/2018 | Liang |
| 2019/0193255 A1 | * | 6/2019 | Valentini ................ B24B 23/04 |
| 2019/0234489 A1 | | 8/2019 | Reed |

FOREIGN PATENT DOCUMENTS

| | | | | |
|---|---|---|---|---|
| DE | 102010012879 A1 | * | 9/2011 | ............... F16H 1/46 |
| DE | 102017222811 A1 | * | 6/2019 | |
| EP | 3270000 A2 | * | 1/2018 | ............... H02K 7/14 |
| FR | 3007099 A1 | * | 12/2014 | ........... F16H 49/005 |
| GB | 209981 A | * | 1/1924 | |
| GB | 922005 A | * | 3/1963 | |
| JP | H08177991 A | * | 7/1996 | |
| JP | 2007244014 A | * | 9/2007 | ........... F16H 49/005 |
| WO | WO-9419625 A1 | * | 9/1994 | ........... F16H 49/005 |
| WO | WO 2018/064709 | | 4/2018 | |
| WO | WO 2019/068187 | | 4/2019 | |
| WO | WO 2019/090430 | | 5/2019 | |
| WO | WO 2019/114033 | | 6/2019 | |

\* cited by examiner

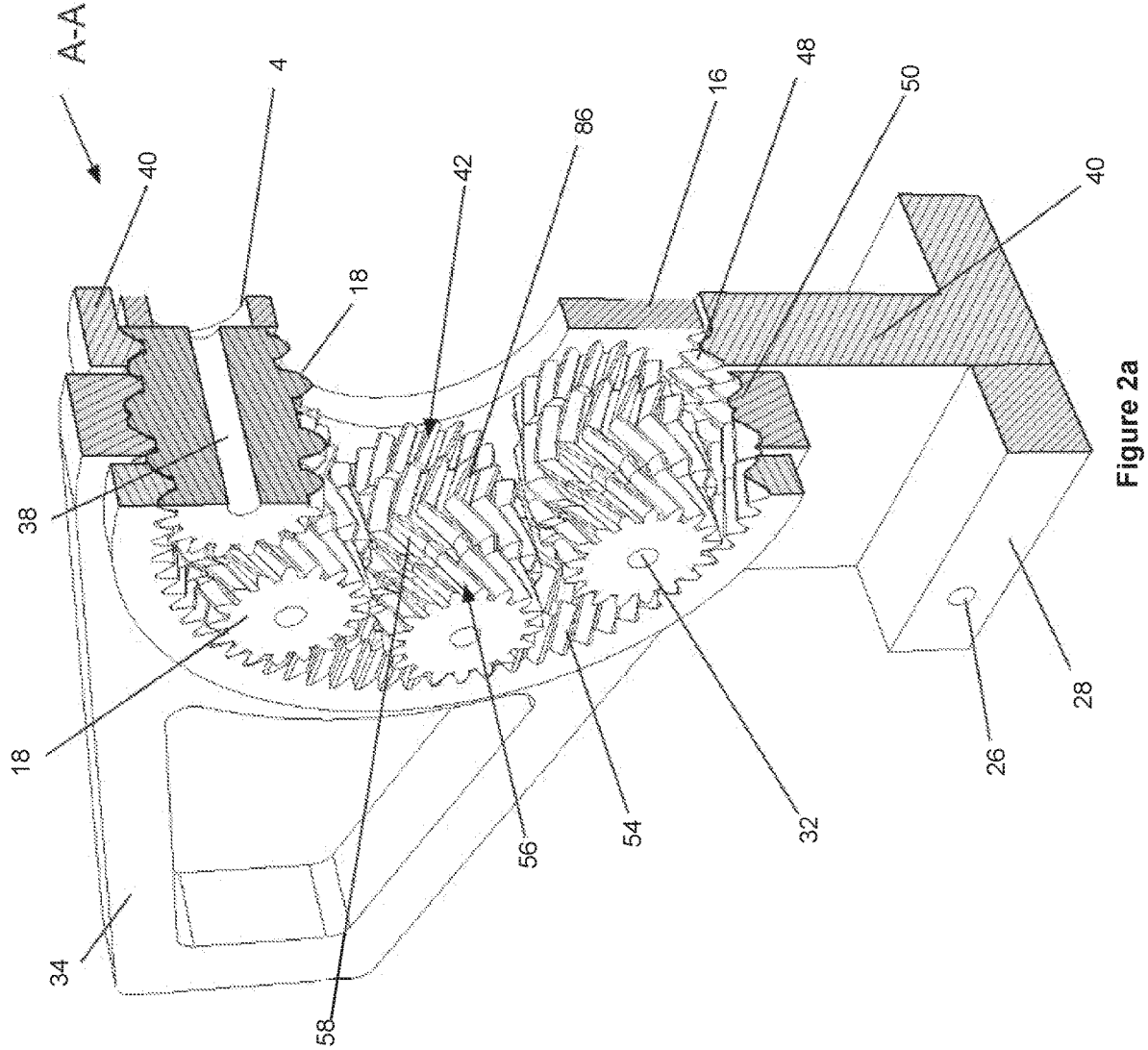

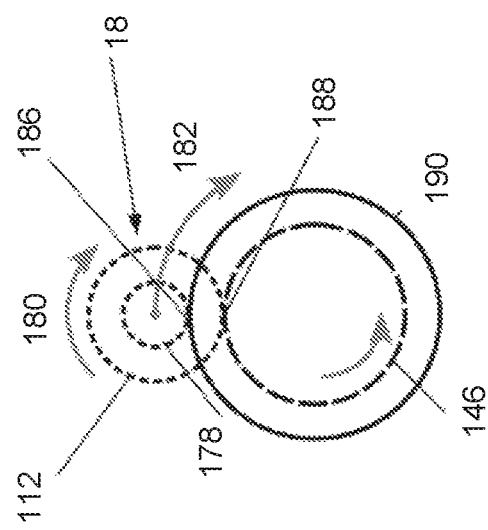
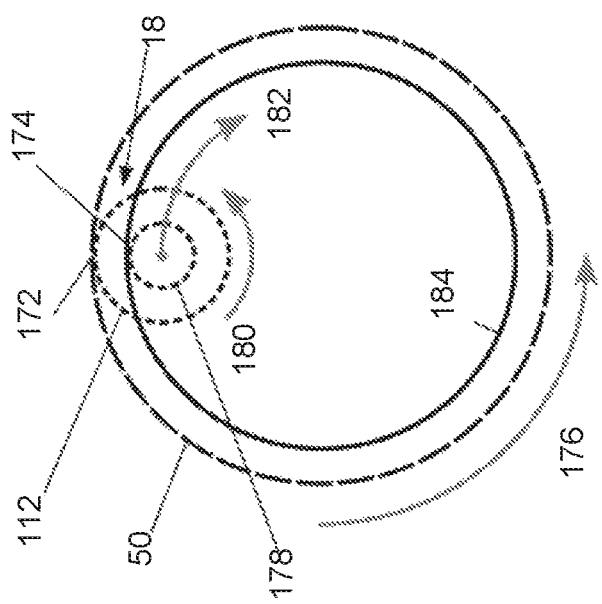
Figure 9a
Figure 9b

SUNLESS PLANETARY GEAR AND METHOD FOR USE

CROSS-REFERENCE TO RELATED APPLICATION

This application claims priority to U.S. Provisional Application No. 62/927,699, filed Oct. 30, 2019, which is incorporated by reference in its entirety.

BACKGROUND

Planetary gearboxes are used to change the speed and torque of an input rotation motion. Planetary gearboxes known in the art have one or more rotatable sun gears revolving around the radial center of the gearbox, planetary gears engaged on their side facing the radial center of the gearbox with and rotating around the radial outside of the one or more sun gears, and a ring gear fixed to a gearbox frame and engaged on their side facing the radial center of the gearbox with the radial outside of the planetary gears.

The one or more sun gears are usually attached to an input rotation, for example through an input shaft extending from the sun gear(s) in a first direction away from the gearbox. The planetary gears are usually deliver an output rotation, for example through an output shaft extending away in a second direction from the gearbox, collinear with and opposite to the first direction.

Typical planetary gearboxes are limited in their use due to a number of factors, such as the lack of an open central passage through the gearbox where the sun gear is located—or if multiple sun gears are used, any central passage would be exposed to rapidly rotating teeth of the sun gears. Typical planetary gearboxes are also limited in their receiving and delivery of input and output rotations along collinear shafts aligned with the center of the gearbox.

SUMMARY

A gearbox device is disclosed that can have planetary gears, one or more ring gears, and no sun gears.

A gearbox device is disclosed that can have planetary gears, one or more sun gears; and no ring gears. The gearbox device can have a first sun gear having at a first transverse position in the gearbox device. The gearbox device can have a second sun gear having a second transverse position in the gearbox device separated from the first sun gear.

The planetary gear can have a first tooth and a second tooth. The first tooth and the second tooth can be on a radial outside of the planetary gear. The first tooth can have a larger radius from a planetary gear rotational center than the second tooth's radius from the planetary gear's rotational center.

The gearbox device can have a slip ring. The slip ring can be fixed to a frame of the gearbox device.

The gearbox device can have a frameless motor. The gearbox device can have a planetary gear frame that can have a planetary gear frame center port. The planetary gear frame center port can have a planetary gear frame center port radius. The frameless motor can have a frameless motor center port. The frameless motor center port can have a frameless motor center port radius. The frameless motor center port radius can be equal to or greater than the planetary gear frame center port radius.

A gearbox device is disclosed that can have a rotational input element, a planetary gear carrier connected to the input element, planetary gears connected to the planetary gear carrier, a first sun gear, and a second sun gear. The first sun gear can have a first transverse position in the gearbox device. The second sun gear can have a second transverse position in the gearbox device separated from the first sun gear. The planetary gears can be in contact with the first sun gear and the second sun gear. The first sun gear can be in a fixed position with respect to a gearbox frame. The second sun gear can be directly fixedly connected to a rotational output element.

A method for using a planetary gearbox is disclosed. The method can include receiving by the gearbox an input rotation energy along an input axis of the gearbox. The method can include transforming the rotational speed and torque of the input rotational energy by the gearbox. The method can include delivering by the gearbox an output rotational energy along an output axis.

Another method for using a planetary gearbox is disclosed. The gearbox can have a central port through the radial center of the planetary gears. The method can include rotating the planetary gears around planetary gear rotational axes. The method can include rotating the planetary gears around a gearbox center axis. The method can include transversely passing an element through the gearbox central port concurrent with the rotating of the planetary gears around the planetary gear rotational axes and around the gearbox central axis.

Yet another method for using a gearbox device is disclosed. The method can include delivering rotational input energy through a planetary gear carrier. The method can include delivering the rotational input energy from the planetary gear carrier to planetary gears connected to the carrier. The method can include rotating by the planetary gears a first sun gear having at a first transverse position in the gearbox device. The method can include contacting by the planetary gears a second sun gear. The second sun gear can have a second transverse position in the gearbox device separated from the first sun gear. The second sun gear can be fixed to a gearbox frame.

BRIEF DESCRIPTION OF THE DRAWINGS

FIGS. 2a and 2b are variations of cross-section A-A of the device of FIG. 1. (FIG. 2a does not show the planet gear axle and planet bearing for illustrative purposes.)

FIG. 8c is a variation of a partial cross-section D-D of the gearbox device of FIG. 8a.

FIG. 8d illustrates a variation of a planet gear from the gearbox device of FIG. 8a.

FIG. 9a is a schematic view of a variation of the sunless planetary gear in use.

FIG. 9b is a schematic view of a variation of the ringless planetary gear in use.

DETAILED DESCRIPTION

Figure 1:
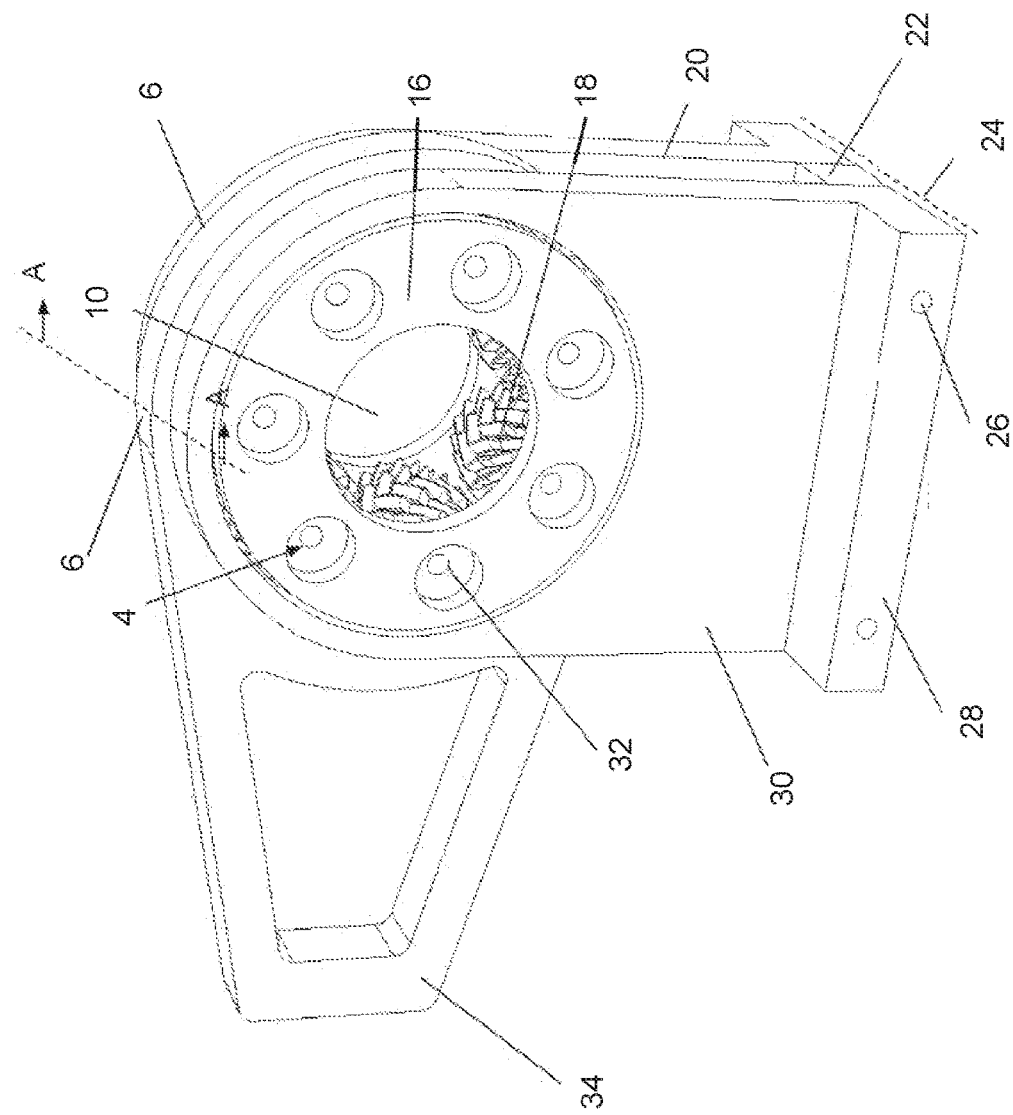
FIG. 1 illustrates a variation of a gearbox device.
Figure 2B:
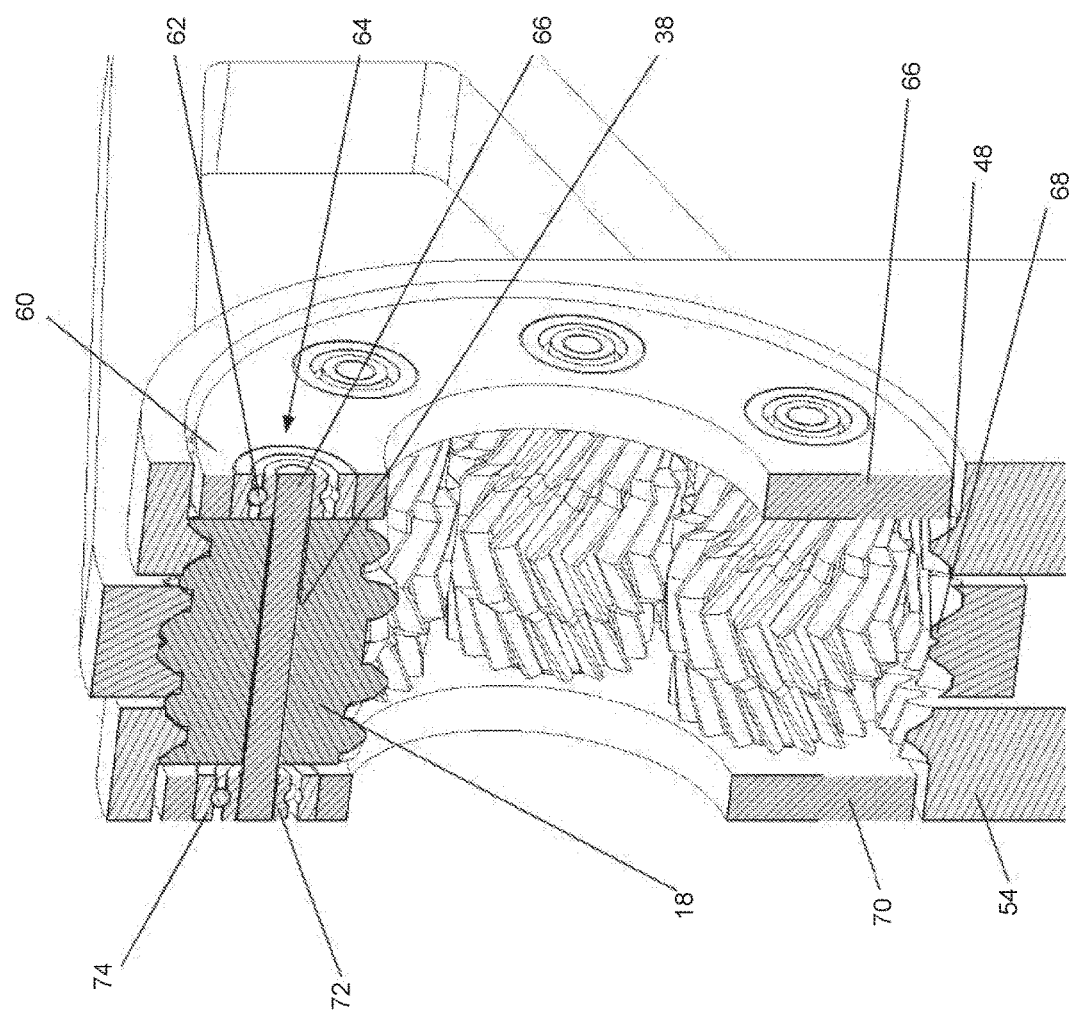

FIGS. 1, 2a, and 2b illustrate that a variation of a planetary gearbox device that can have planet and ring gears 184. The gearbox device can have a gearbox frame 40 or housing. The planetary gearbox device can have a planetary gearbox longitudinal axis 80. The gearbox frame 40 can have a gearbox frame first side 30 on a first longitudinal side of the gearbox and a gearbox frame second side 20 on a second longitudinal side of the gearbox opposite to the first longitudinal side. The gearbox frame first side 30 can be integrated with the gearbox frame second side 20 (e.g., two sides of a single cast part). The gearbox frame first side 30 can be separated and distinct from the gearbox frame second side 20. For example the gearbox frame first side 30 can be fixed to a first longitudinal side of a gearbox frame spacer 22, and the gearbox second side 20 can be fixed to a second longitudinal side of a side of the gearbox frame spacer 22.

The gearbox can have a gearbox mount 28, such as a flange extending off the gearbox frame 40. The gearbox mount 28 can be attached to the remainder of the gearbox frame 40, such as by one or more gearbox mount screws 26. The gearbox mount 28 can be fixedly attached to an external structure such as a car chassis or robotic arm or leg.

The gearbox device can have from about two (e.g., with "empty spots" where at least third and fourth planet gears 18 would otherwise be between the two planet gears 18, the "empty spots" occupied by spacers, tubes or closed channels carrying fluids—the fluid can be agitated as the tube rotates around the gearbox device during use, impeller or fan for example to blow fluid through the gearbox such as for cooling, or combinations thereof) to about 1,000 planet gears, more narrowly from about six to 100 planet gears 18, even more narrowly from about ten to about twenty. For example, the gearbox can have a prime number of planet gears 18, such as seven, 11, 13, or 17 planet gears 18.

The radial outer surface of the planet gears 18 can have planet gear teeth 76, 86. The planet gears 18 can have a stepped cylindrical shape, having cylindrical shapes of different radii with right angled steps between the regions with different radii, as shown in FIGS. 1-3. The planet gears 18 can have varying conical shapes with differing constant angles away from the longitudinal axis. The planet gears 18 can have steps and varying conical shapes.

The gearbox device can have a center port 10 extending longitudinally through the radial center of the set of planet gears 18. The center port 10 can be empty. Cables or wires can extend through the center port 10. A gearless tube 14 or channel can extend through the central port. Fluid and/or solid elements, such as cooling fluid, fuel, wires, or cables, can extend or flow through the gearless tube 14 or channel. The gearless tube 14 or channel can have a large enough outer diameter to contact the planet gears 18 or a small enough outer diameter to not contact the planet gears 18.

The radial inside surface of the gearbox frame first side 30 at the center port 10 can have, be fixedly attached to, or form a first (fixed) ring gear 184. The first ring gear 184 can have first ring gear teeth. The radial inside surface of the gearbox frame second side 120 at the center port 10 can have, be fixedly attached to, or form a second (fixed) ring gear 184. The second ring gear can have second ring gear teeth.

The planet gear teeth 76, 86 can mesh, engage, or interface with the respective fixed ring gear teeth.

The planet gears 18 each can have a bearing, shaft, or axle port 78 extending through the length of the radial center of each planet gear 18. A planet gear bearing, shaft, or axle 32 can extend through the planet gear axle port. Each planet gear 18 can rotate around its respective planet gear axle 32 which can extend along the planet gear longitudinal axis 80.

The gearbox device can have a carrier plate 16. The carrier plate 16 can be cylindrical shaped with a hole in the radial middle aligned with the center port 10 of the gearbox device. The carrier plate 16 can have a carrier mount port 4 for every planet gear 18 (and "empty spots", if any). The radial center of each carrier mount port 4 can align with each planet gear longitudinal axis 80 and any "empty spot" (e.g., tubes, channels) longitudinal axis.

The planet gears 18 can be spaced apart from each other so there is a gap between the planet gears 18 and they do not directly contact each other.

The planet gears 18 can each rotate along the planet gear longitudinal axis 80 with respect to the respective carrier mount ports 4, for example through bearings in the planet axle channel 38 and/or in the carrier mount port 4, as shown in FIG. 2b. The planet gears 18 can each have a planet axle channel 38 that terminates at the planet axle ports 100. The radial center of each planet axle channel 38 can align with the longitudinal axis of the planet gear 80 and/or the carrier mount port 4.

Each planet gear 18 can be translatably fixed and rotatably attached to a planet bearing 64. The planet bearing 64 can be between the planet axle 66 and the surface of the planet axle channel 38 and/or between the planet axle 66 and the radial surface of the carrier mount port 4. The planet bearing 64 can have a bearing inner ring 72, a bearing outer ring 74 radially outside of the bearing inner ring 72 (with respect to the radial center of the planet axle 66) and bearing rollers or balls 62 radially between the bearing inner ring 72 and bearing outer ring 74 (with respect to the radial center of the planet axle 66). The planet bearing 64 can have a lubricant between the bearing outer ring 74 and the bearing inner ring 72. The bearing outer ring 74 and bearing inner ring 72 can be permanent magnets repelling each other.

The planet gears 18 can each be translatably fixed with respect to the respective carrier mount ports 4, for example via the planet gear shaft or axle 66 that can extend through and out of the planet axle port 100 and into the carrier mount port 4.

The gearbox device can have an output flange 6 radially outside of the planetary gears 18. The radial exterior of the output flange 6 can have, be fixedly attached to, or form an output arm 34.

The radial inside of the output flange 6 can have, be fixedly attached to, or form an output ring gear 50.

The planet gear teeth 76, 86 can mesh, engage, or interface with the respective output ring gear teeth.

The output ring gear 50, output flange 6, and output arm 34 can be configured to rotate with respect to the longitudinal axis 24 of the carrier or center port 10 of the gearbox device and deliver output energy to an energy receiver, such as a robotic arm or leg, driveshaft for an impeller, propeller or turbofan (e.g., for pumps or airplanes), axle or wheel (e.g., for road vehicles, for example positioning the entire gearbox device and motor in or adjacent to a wheel), or combinations thereof.

The output gear can rotate in the opposite direction of the planet carrier 138.

The planetary gearbox device can have no sun gear.

Rotation of the planet carrier 138 about a planet carrier longitudinal central axis 80 can cause the rotation of each planet gears 180 around its respective planet gear longitudinal axis 80 and around the planet carrier longitudinal central axis. These two rotations of the planet gear 180 can cause the rotation of the output ring gear 50 around a central longitudinal axis of the planet ring gear (e.g., which can be collinear with the planet carrier 138 longitudinal central axis).

Figure 3A:
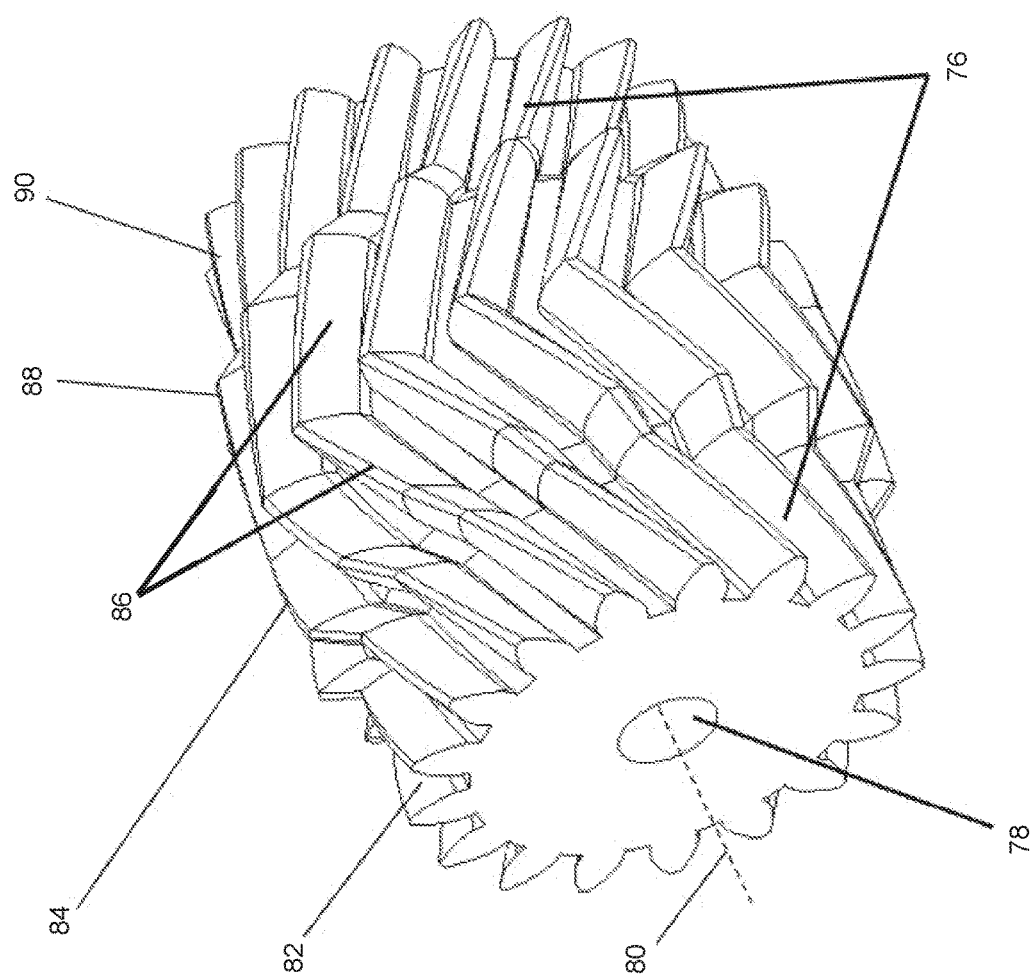
FIGS. 3a and 3b illustrate a variation of the planet gear.
Figure 3B:
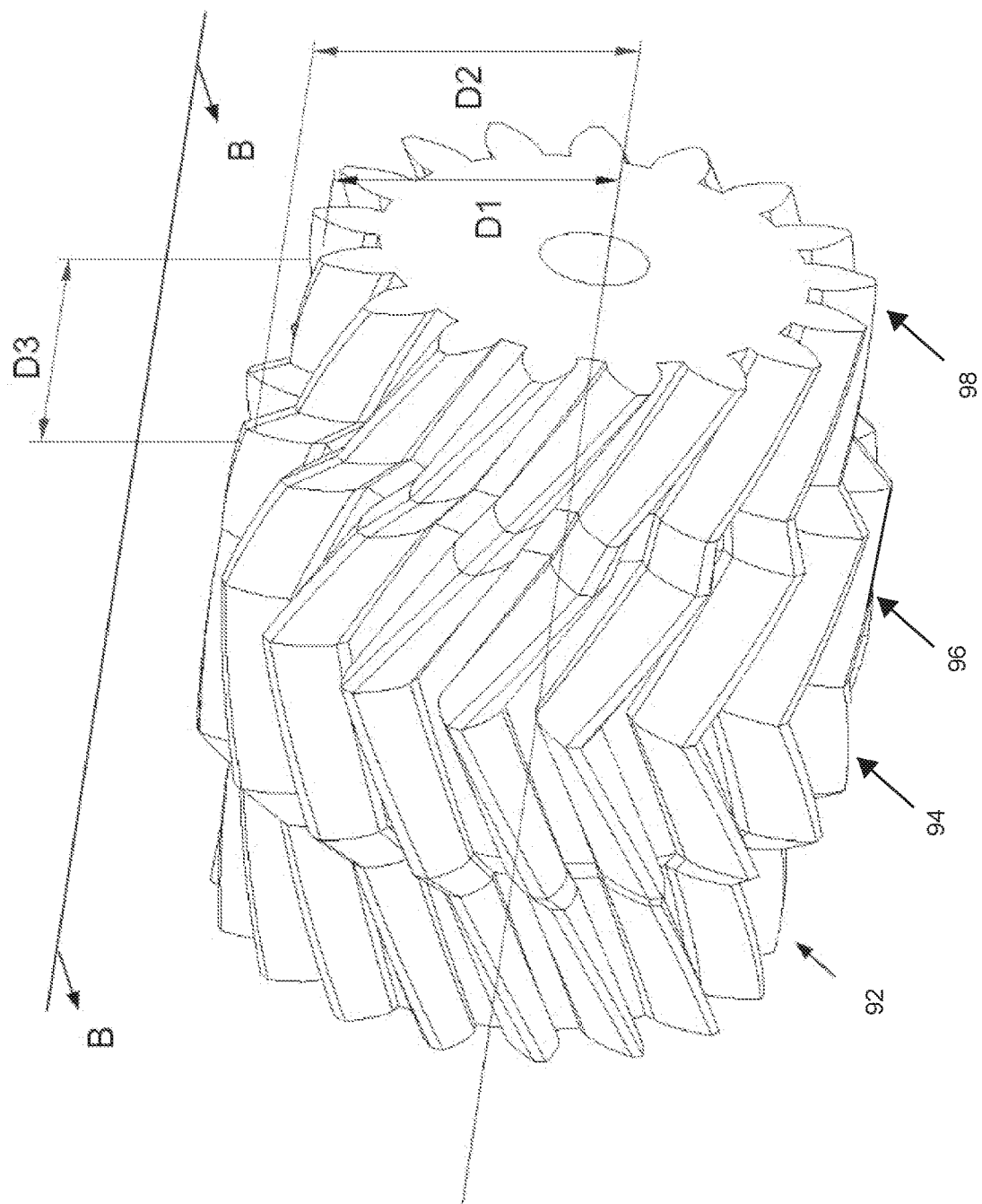
Figure 3C:
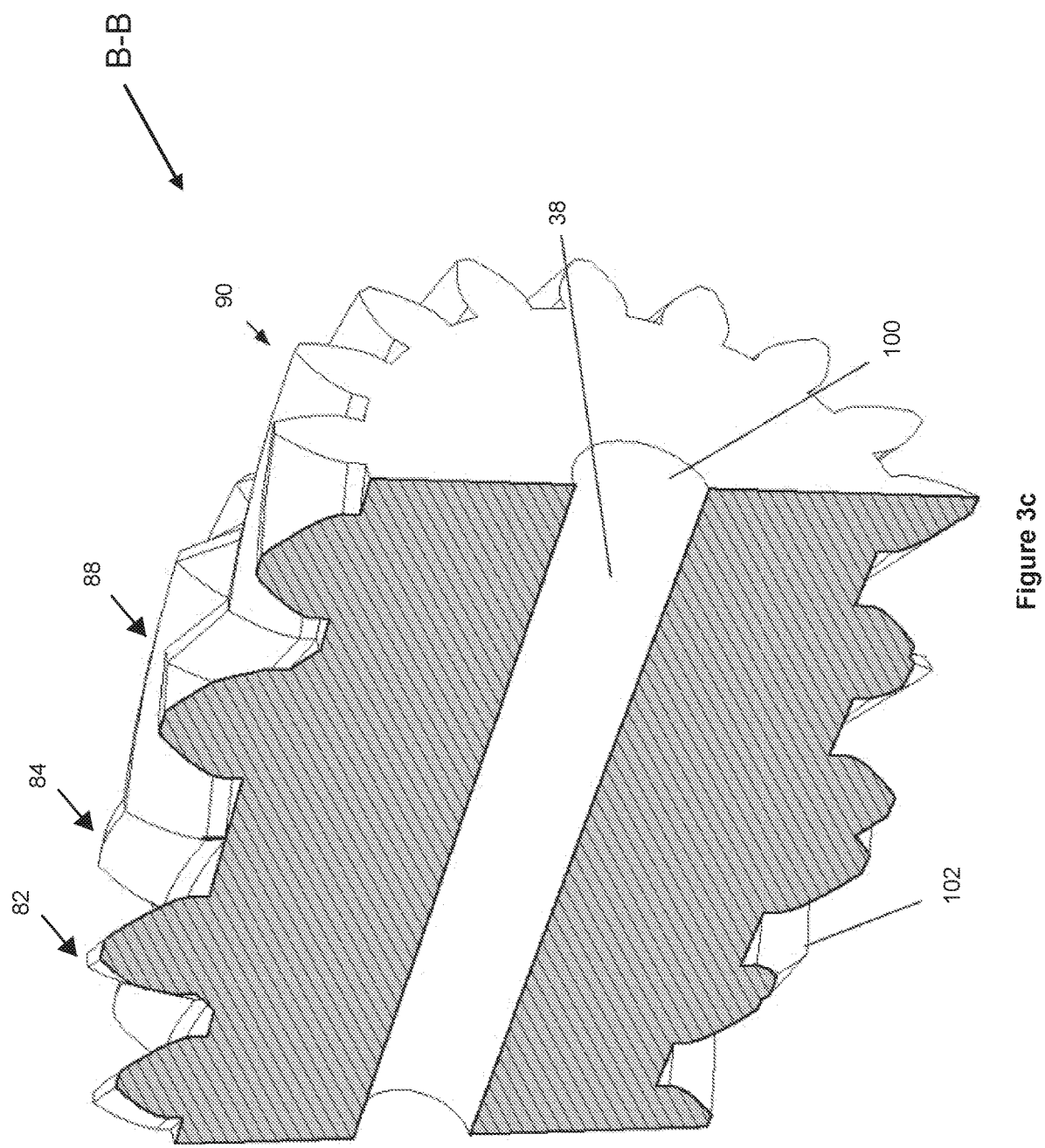
FIG. 3c is a variation of cross-section B-B of the planet gear of FIG. 3b.

FIGS. 3*a* through 3*c* illustrate that the planet gear 18 can have a planet gear longitudinal axis 80. The planet gear can have a planet bearing 64, shaft, or axle ports 78 that can be at the terminal longitudinal ends of a planet bearing 64, shaft or axle channel 38.

The planet gear 18 can have multiple longitudinal engagement zones, areas, lengths or regions. The longitudinal engagement regions can be longitudinally sequential with each other. The planet gear 18 can have a proximal, proximal-middle (proximal-central), distal-middle (or distal-central), and distal engagement regions 98 that can have proximal 82, proximal-middle 84, distal-middle 88, and distal teeth 90, respectively that can engage and interface with teeth on a corresponding ring (or sun) gear.

The teeth on the different regions can have the same or different teeth dimensions as the teeth on the other regions, such as the pitch, the face width, addendum, dedendum, total depth, working depth, tooth thickness, fillet radii, tooth space, or combinations thereof. For example, regions that are longitudinally symmetrical about the longitudinal centerline plane can have identical teeth dimensions as each other, and non-symmetrically located regions can have different teeth dimensions from each other.

The different engagement regions can have the same or different outer radii. Engagement regions with different outer radii can have a gear ratio other than 1:1, for example driving more than one output flange 6 or output gear.

The different engagement regions of a planetary gear 18 can align and mesh/engage/interface with different regions of one or more ring gears, or each planetary gear 18 engagement region can align with and interface an entirely different ring gear.

One or more non-engagement regions can be between and/or at the longitudinal ends of the engagement regions. For example, a planet gear 18 can have non-engagement regions interspersed along and/or at the ends of the planet gear 18. For example, the non-engagement regions can have a smaller radius than needed to engage or contact the adjacent ring or sun gear, and/or the non-engagement regions can be toothless (e.g., if the engagement regions have teeth) and/or magnetless (e.g., if the engagement regions have magnets) and/or effectively frictionless (e.g., if the engagement regions are friction drive regions). The non-engagement region can be in contact with a roller (e.g., to measure angular position and/or rotational speed), reflective (e.g., to measure position and/or rotational speed with an optical sensor), have blades extending radially inwardly and/or outwardly (e.g., to control fluid flow around the planet gear 18 and/or macerate or otherwise condition or stir material adjacent to the planet gear 18), or combinations thereof.

The distal and/or proximal engagement regions 178 can have an outer radius D1 from about 5 mm to about 500 mm, more narrowly from about 10 mm to about 20 mm, for example about 10 mm, 15 mm, and 20 mm.

One or both of the middle engagement regions 112 can have an outer radius D2 from about 5 mm to about 500 mm, more narrowly from about 10 mm to about 20 mm, for example about 10 mm, 15 mm, and 20 mm.

D2 can be larger or smaller than D1. The difference between D2 and D1 can be from D2 being about 50% smaller to about 100% larger (but not 0%) than D1, more narrowly from 1% larger to about 25% larger, for example 15% larger, 10% larger, or 5% larger. For example D2 can be about 115% of D1.

The gear ratio can directly correlate and scale with D1/(D2−D1). The gear ratio can also be influenced by other dimensions, such as the dimensions of the ring or sun gear.

Any engagement region can have an engagement region length (shown in FIG. 3*b* for the distal engagement region 98) D3 from about 25 mm to about 2500 mm, more narrowly from 50 mm to about 100 mm, for example about 50 mm, 75 mm, and 100 mm. The ratio of D3 to D1 can be about 5:1.

The engagement region lengths can be equal or differ between some or all of the engagement regions in a single planet gear 18. The outer radii of the distal and proximal engagement regions 178 can be the same (as shown in FIG. 3*b*) or differ. The outer radius of the proximal-middle engagement regions 94 can be the same or different from the outer radius of the distal-middle engagement region 96.

Figure 3D:
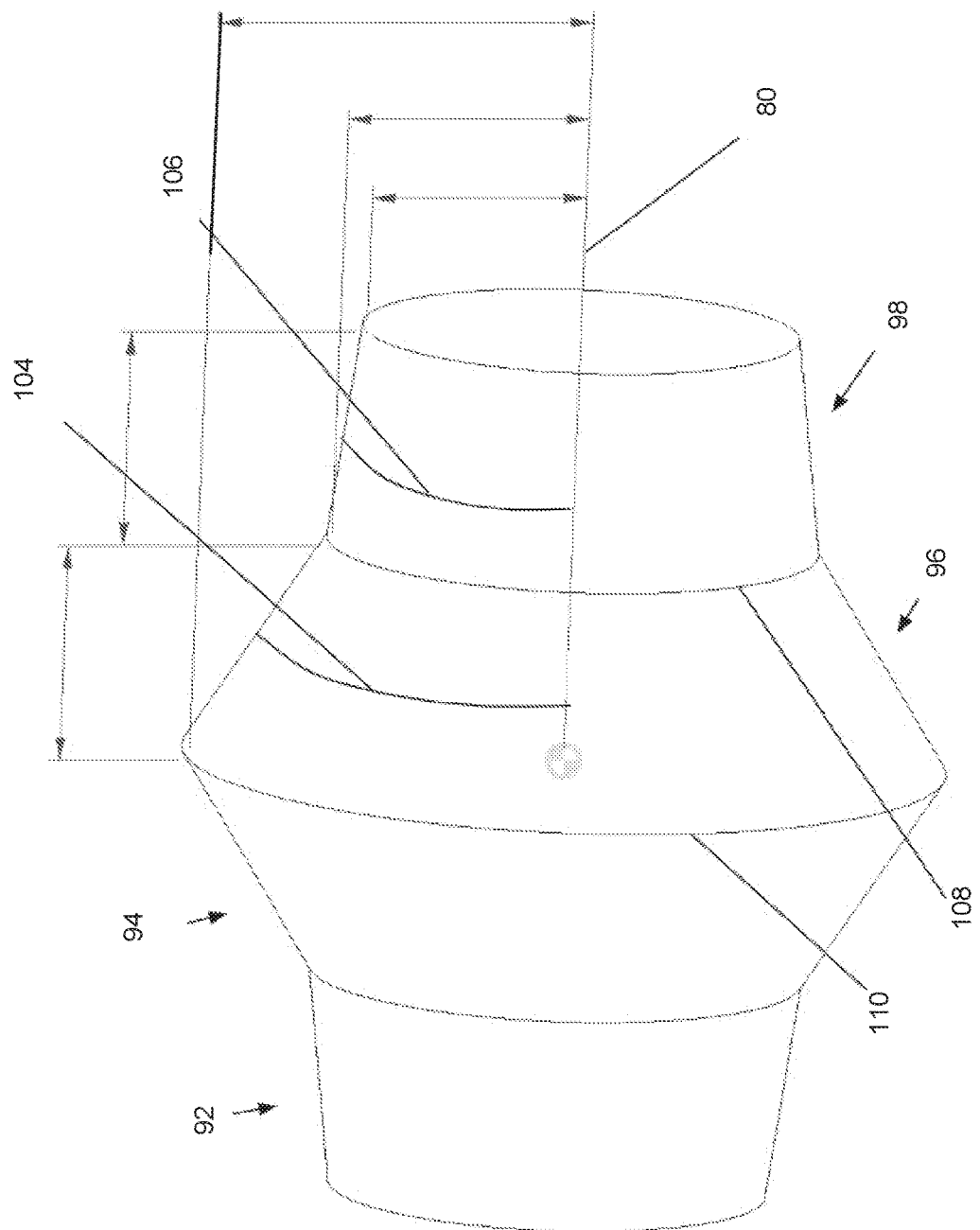
FIGS. 3d through 3h are simplified views of variations of the planet gears.

FIG. 3*d* illustrates that the planet gears 18 can have one or more (e.g., all) engagement regions with radial outer surfaces that have slopes with respect to the planet gear longitudinal axis 80. The planet gears 18 can have angled or sloped end engagement regions 106, and/or middle engagement regions 104. The sloped engagement regions can be sloped at the same or different angles.

The distal engagement region 98 can have a radial outer surface with a distal engagement region angle 104 with respect to the planet gear longitudinal axis 80. The distal-middle engagement region 98 can have a radial outer surface with a distal-middle engagement region angle 104 with respect to the planet gear longitudinal axis 80. The distal engagement region angle 96 can be less (as shown in FIG. 3*d*), more, or equal to the distal-middle engagement region angle 104. The proximal-middle engagement region 94 can have a proximal-middle engagement region angle that is less (shown as the negative of the distal-middle engagement region angle), more, or equal to the distal-middle engagement region angle 104.

A centerline ridge 110, rib or spine can be at the border between the proximal-middle engagement region 94 and the distal-middle engagement region 96, as shown. An inter-region ridge, rib or spine can be at the border of adjacent engagement regions where the first engagement region with the smaller average outer radius has a larger engagement region angle than the adjacent second engagement region, or where adjacent engagement regions with equal radii have different engagement region angles, as shown between the middle engagement regions 112 in FIG. 3*d*.

An inter-region crease 108, fold, valley, or gulley can be between the distal engagement region 98 and the distal-middle engagement region 96, as shown. An inter-region crease 108 can be at the border of adjacent regions where the first engagement region having a smaller average outer radius has a smaller engagement region angle than the adjacent second engagement region.

Figure 3E:
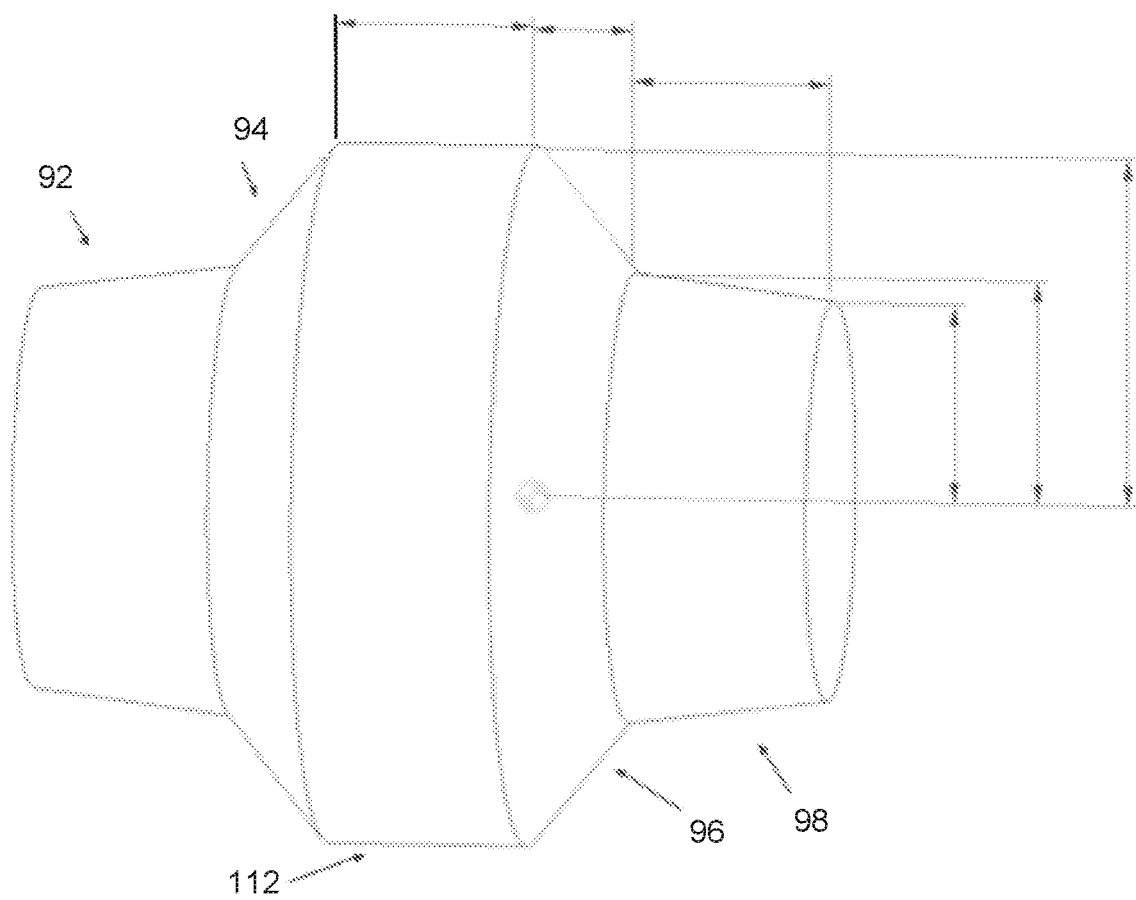
Figure 3F:
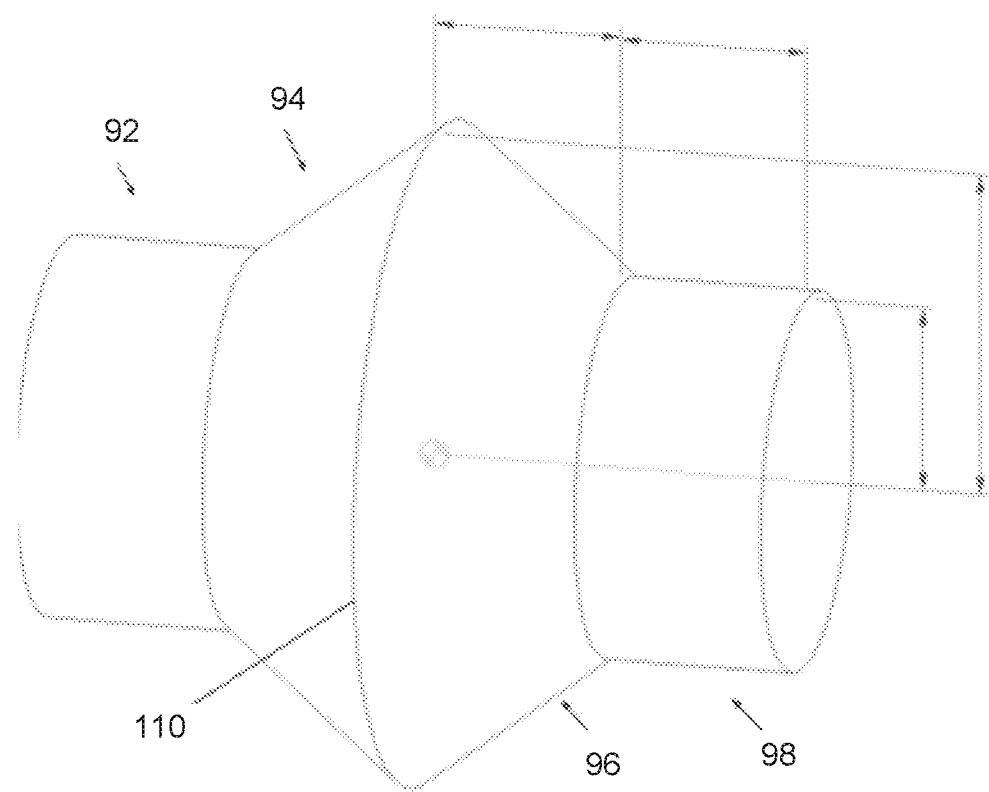
Figure 3G:
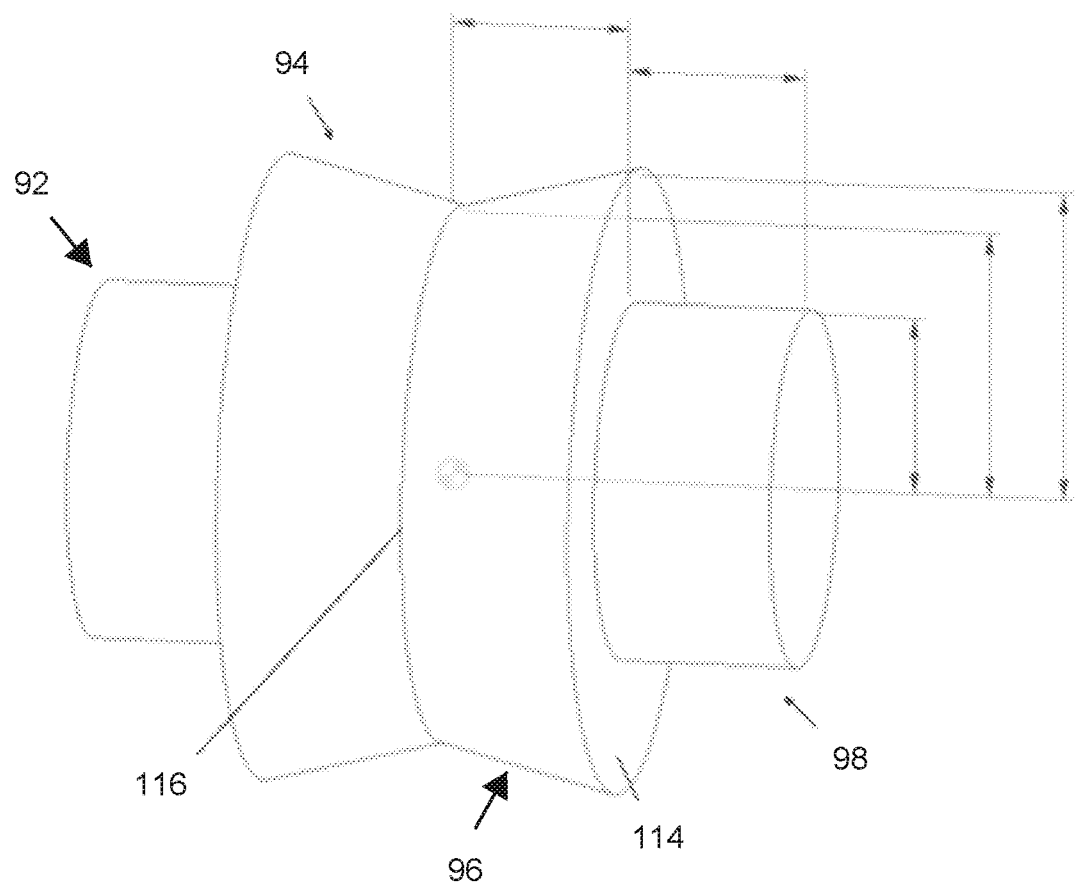
Figure 3H:
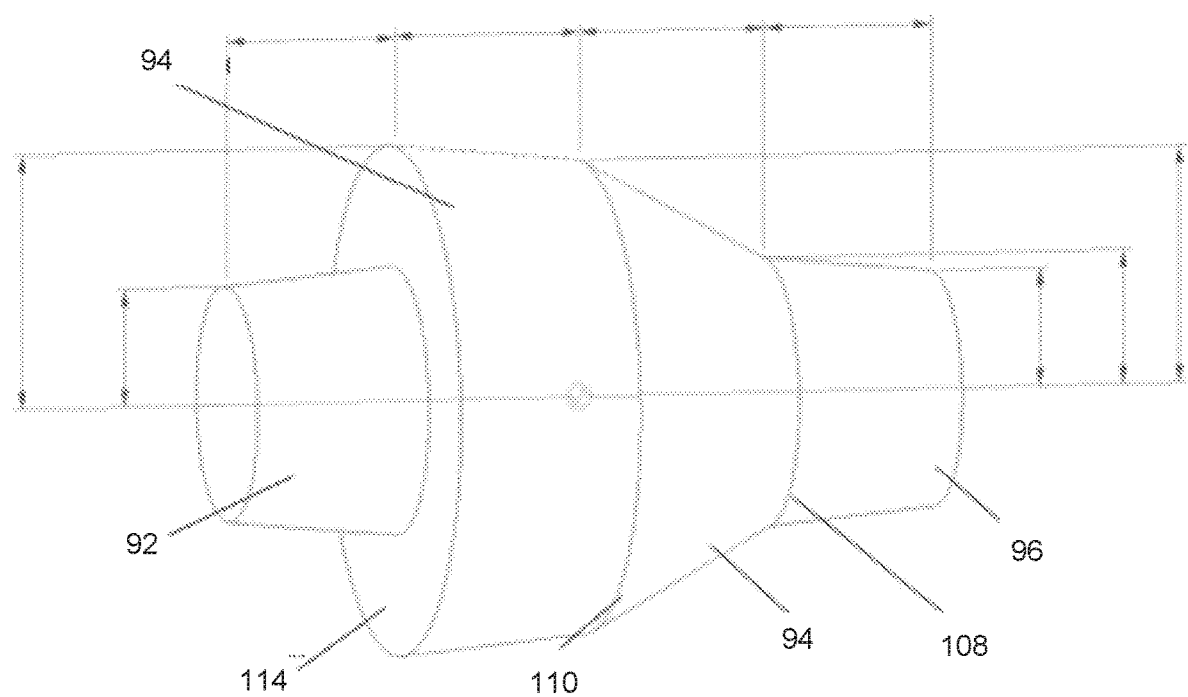

The planet gear 18 can be symmetric (as shown) or asymmetric about the centerline plane (as shown in FIG. 3*h*) and/or about the planet gear longitudinal axis 80 (e.g., a cammed lobe gear).

The planet gear 18 can have a ridge, such as a centerline ridge 110 (does not have to be at center or at a positive angle).

FIG. 3*e* illustrates that the planet gear 18 can have five engagement regions. The planet gear 18 can have a middle engagement region 112 between the proximal-middle engagement region 94 and the distal-middle engagement region 96. The engagement regions in a planet gear 18 can each have the same engagement region lengths or one or more engagement regions can have different engagement region lengths. For example, as shown in FIG. 3*e*, the distal and proximal engagement region 178 lengths can be larger than the middle engagement 112 region length, and the middle engagement region 112 length can be larger than the middle-proximal and middle-distal engagement region lengths.

The middle engagement region 112 can have a cylindrical or flat (albeit possibly with teeth, texturing, or other non-flat interfacing feature) outer radial surface with respect to the planet gear longitudinal axis 80. The planet gear 18 can have one or more angled or sloped engagement regions 104, 106, and one or more flat engagement regions.

FIG. 3*f* illustrates that the planet gear 18 can have cylindrical or flat distal and/or proximal engagement regions 178 and angled or sloped proximal-middle or distal-middle engagement regions.

FIG. 3*g* illustrates that the distal-middle engagement region 96 can have a negative slope or angle and the proximal-middle engagement region 94 can have a positive slope or angle. The centerline can be inverted as a centerline crease 116.

The distal and/or proximal engagement regions 178 can have cylindrical or flat outer radial surfaces. The borders between the distal engagement region 98 and the distal-middle engagement region 96 and/or the proximal engagement region 92 and the proximal-middle engagement region 94 can each have a discrete radial step having a step wall face 114.

FIG. 3*h* illustrates that the planet gear 18 can be longitudinally asymmetric. All or some of the longitudinally corresponding engagement regions can be asymmetric with respect to each other (as shown) and/or the lengths of the engagement regions can be irregular so there some or all of the engagement regions have no corresponding engagement region at the same longitudinal position opposite from the centerline.

For example, the proximal engagement region 92 can be longitudinally symmetric with the distal engagement region 98, but the proximal-middle engagement region 94 can have a different length and/or not the negative angle with respect to the distal-middle engagement region 96.

For the sake of not having an overly tedious detailed description, all other combinations and numbers of engagement regions having the outer radial surface configurations shown in FIGS. 3*a* through 3*h* are not illustrated but are considered to be disclosed herein to one having ordinary skill in the art.

Figure 4:
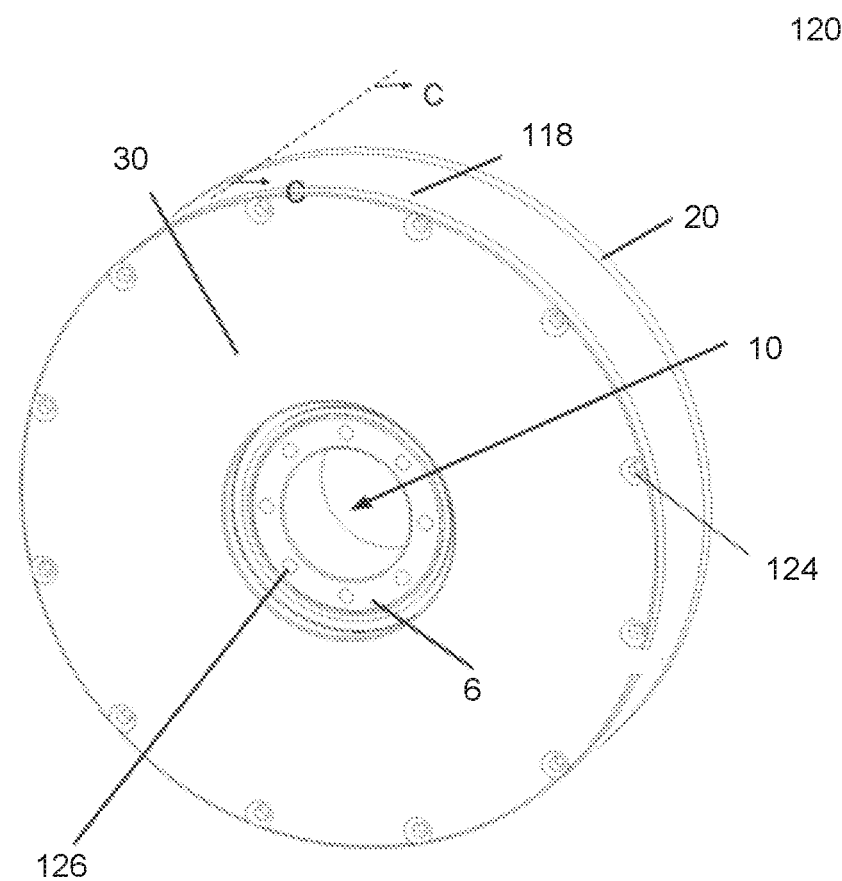
FIG. 4 illustrates a variation of the gearbox device.
Figure 5A:
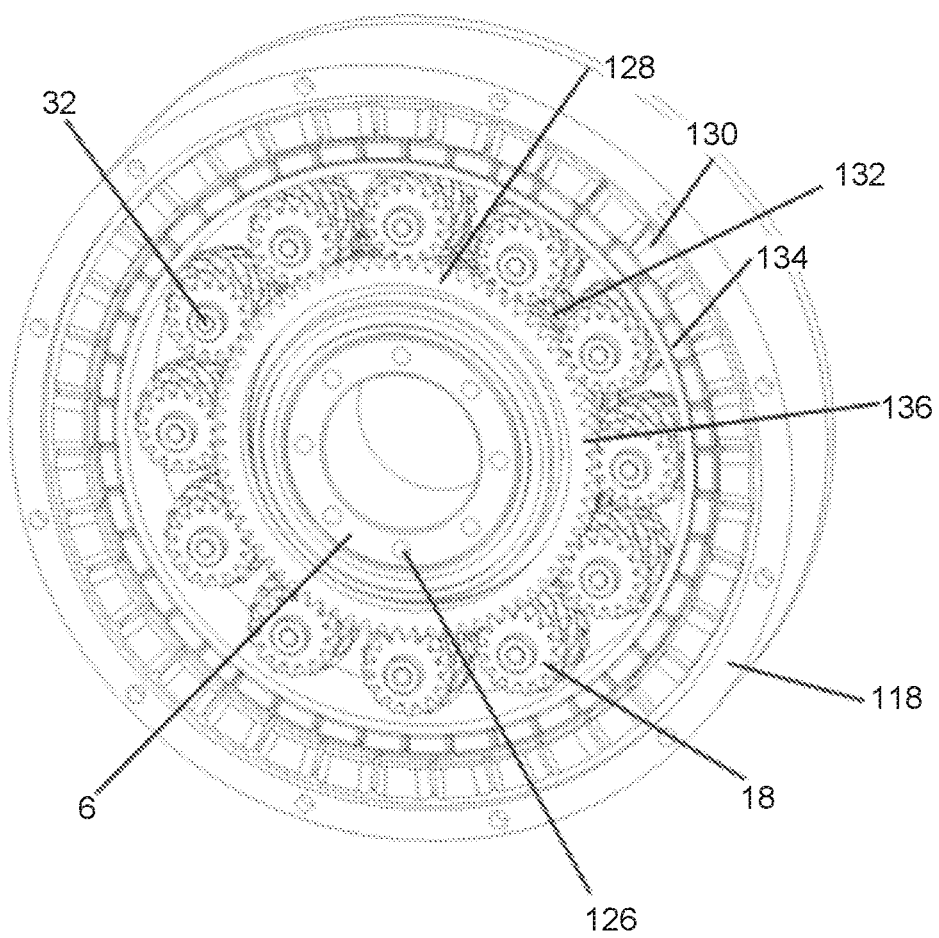
FIG. 5a illustrates a variation of the gearbox device having a motor (the frame is not shown for illustrative purposes).
Figure 5B:
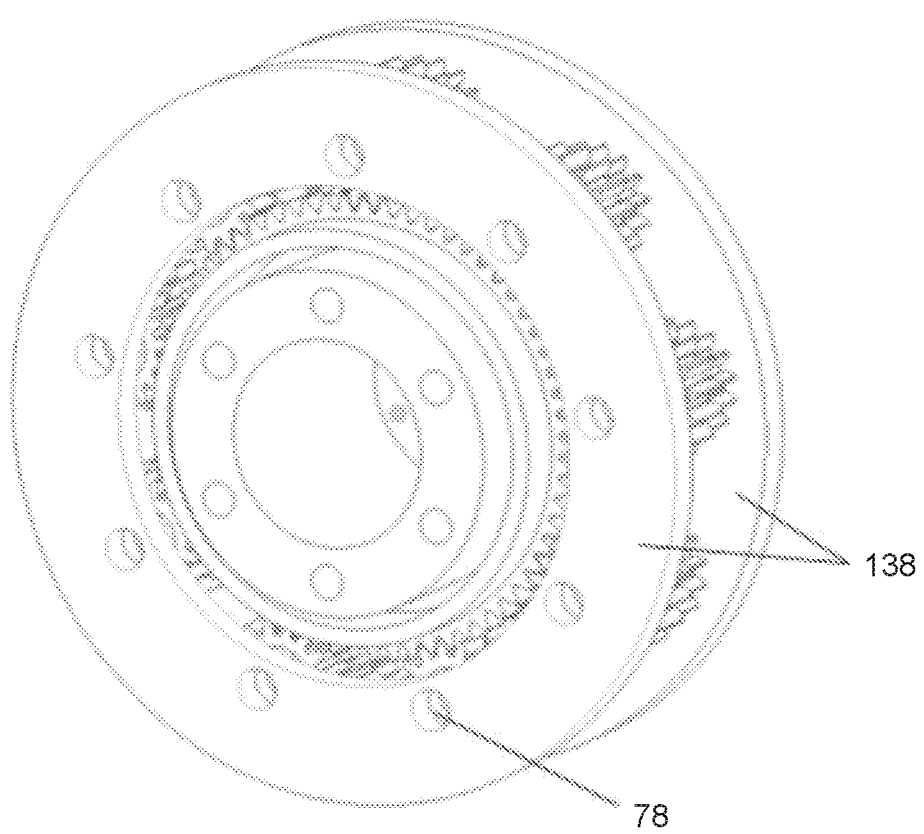
FIG. 5b illustrates a variation of the gearbox device (the frame is not shown for illustrative purposes).
Figure 6A:
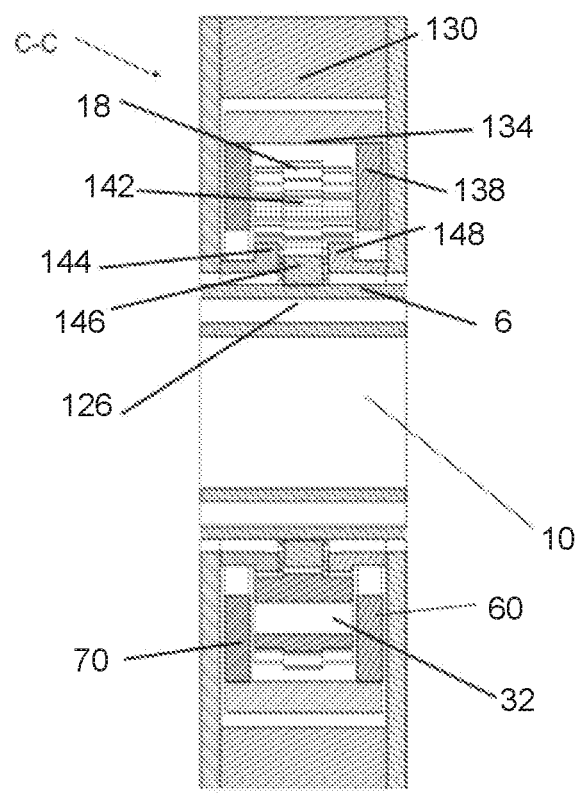
FIG. 6a is a variation of cross-section C-C of the gearbox device of FIG. 4 with one planet gear not shown in cross-section and the planet gear axles not shown for illustrative purposes.
Figure 6B:
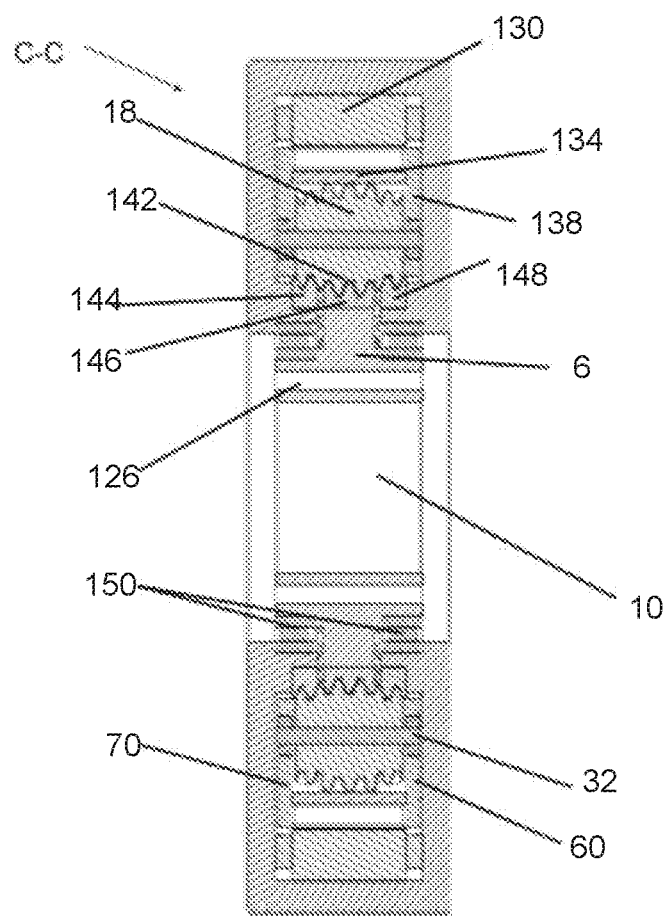
FIG. 6b is a variation of cross-section C-C of the gearbox device of FIG. 4.
Figure 7:
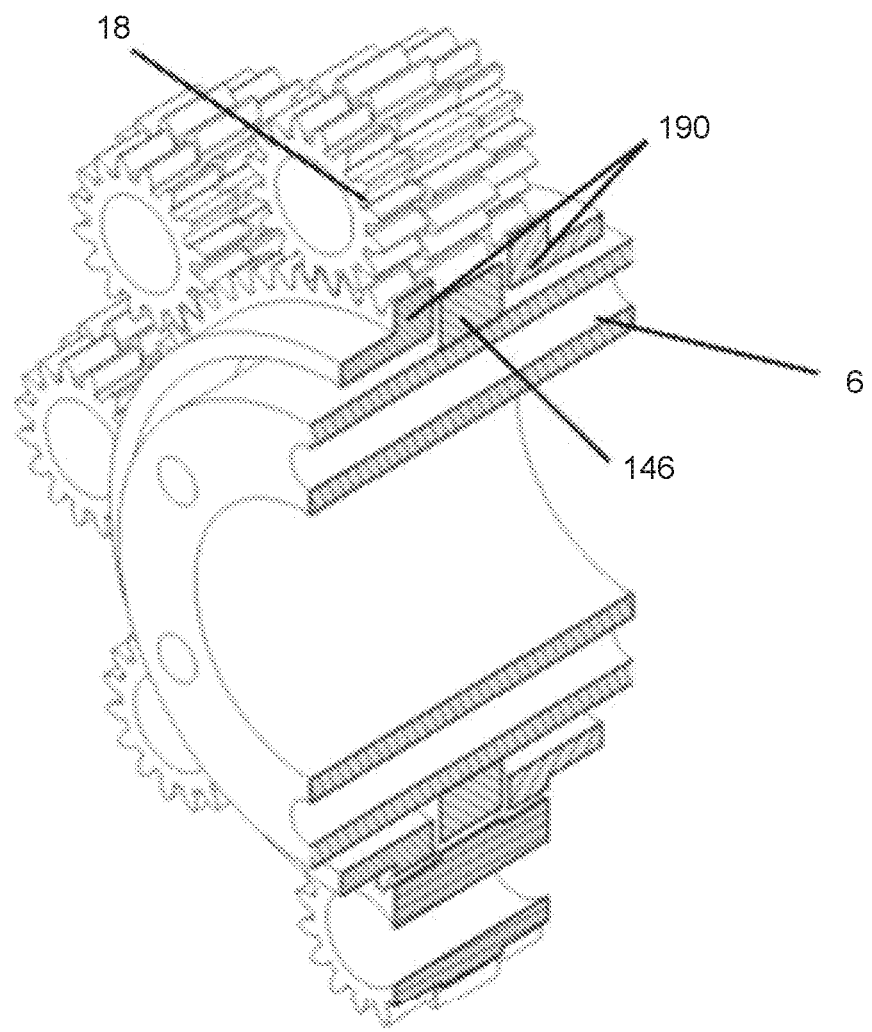
FIG. 7 is a sectional view of a variation of selected internal elements of the gearbox device of FIG. 4.
Figure 8A:
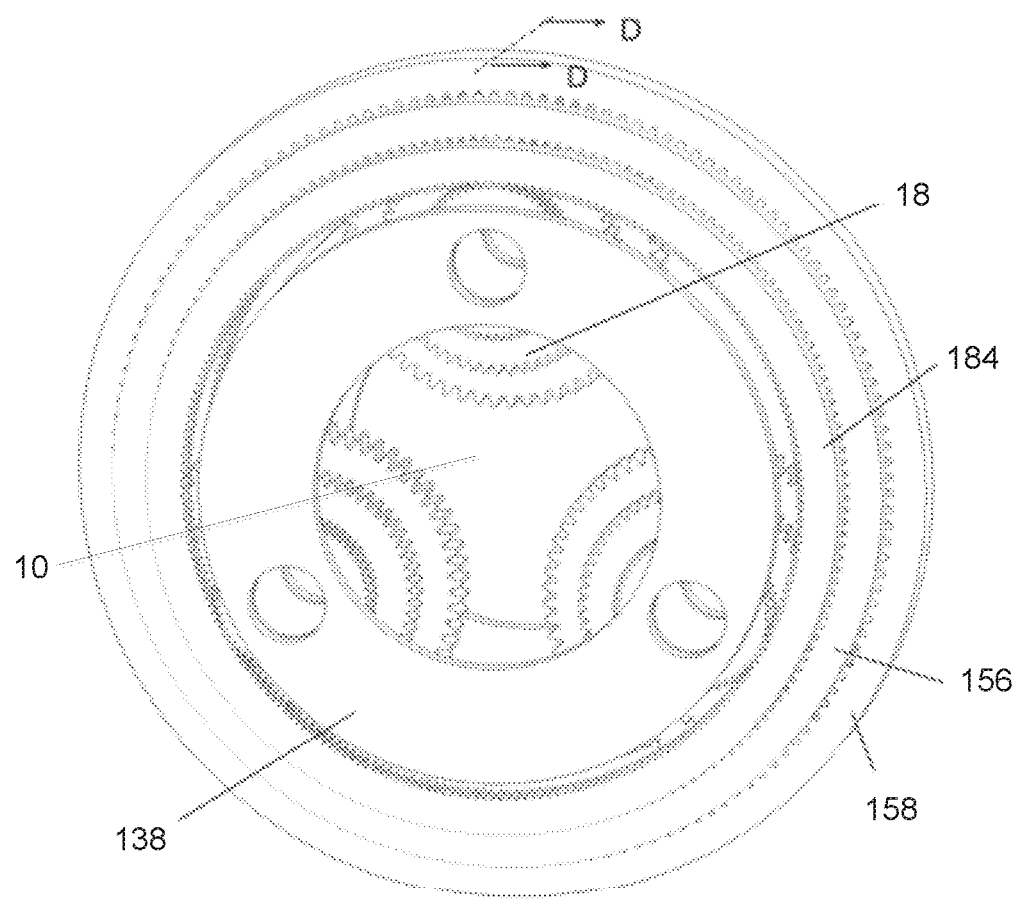
FIG. 8a illustrates a variation of the gearbox device.
Figure 8B:
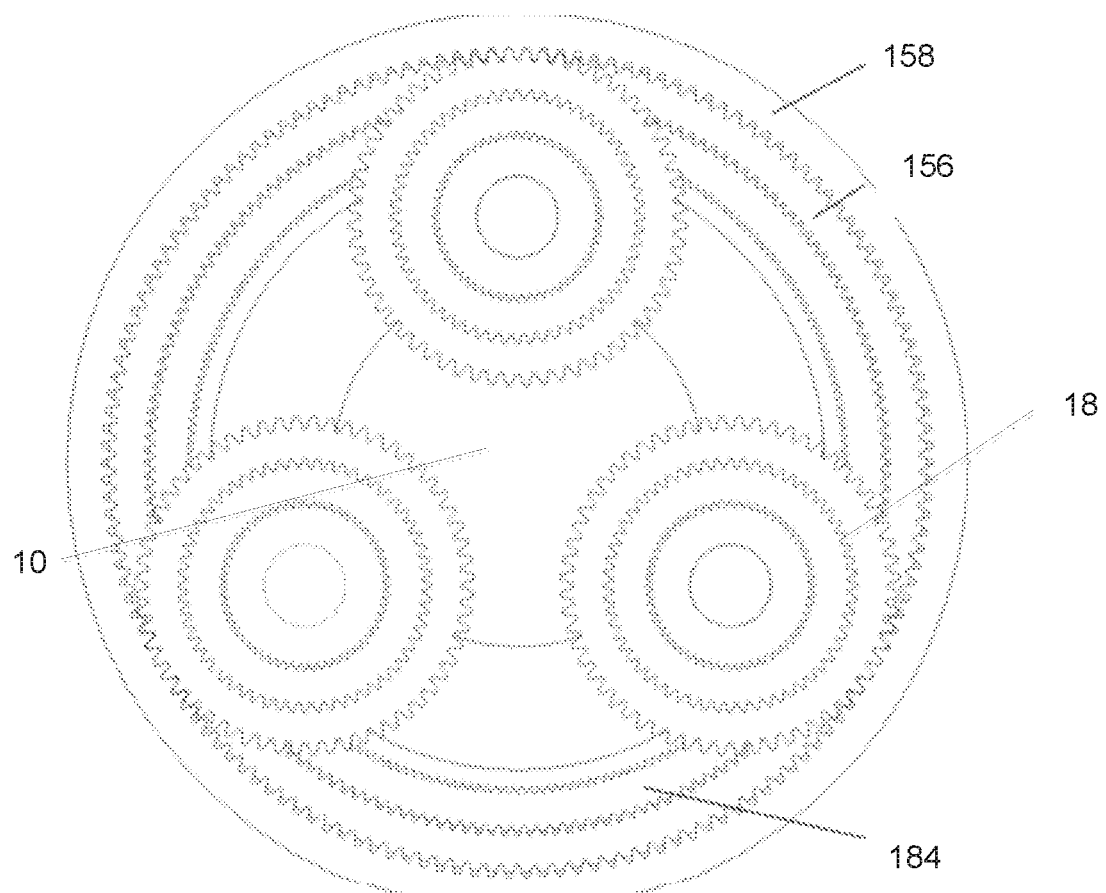
FIG. 8b is an end view of the gearbox device of FIG. 8a with one planet carrier and some ring gears removed for illustrative purposes.
Figure 8C:
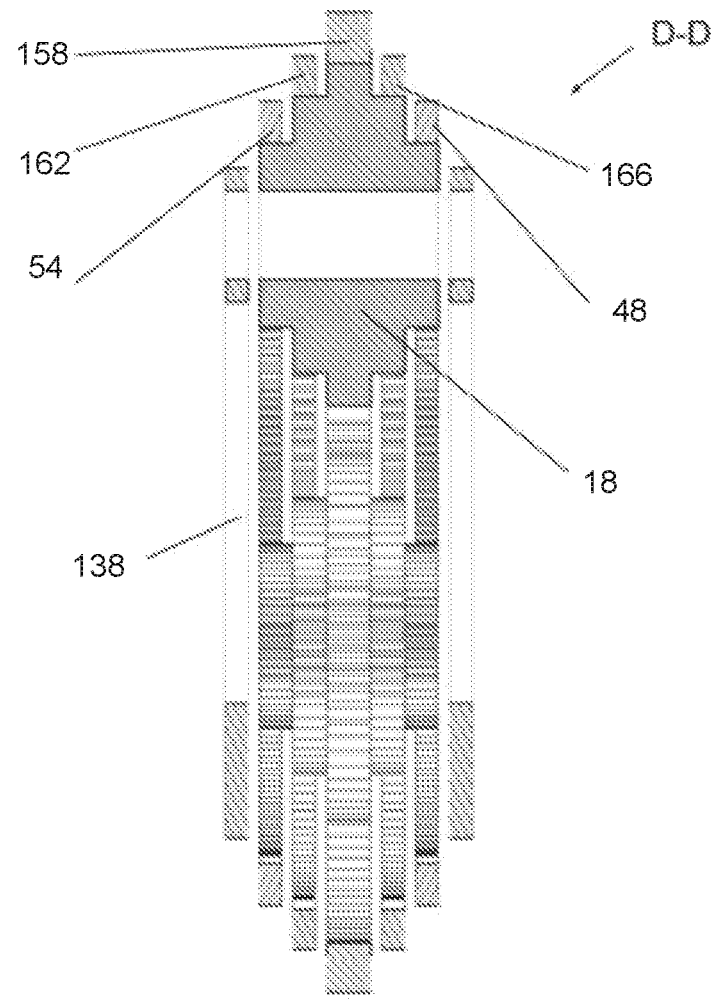
Figure 8D:
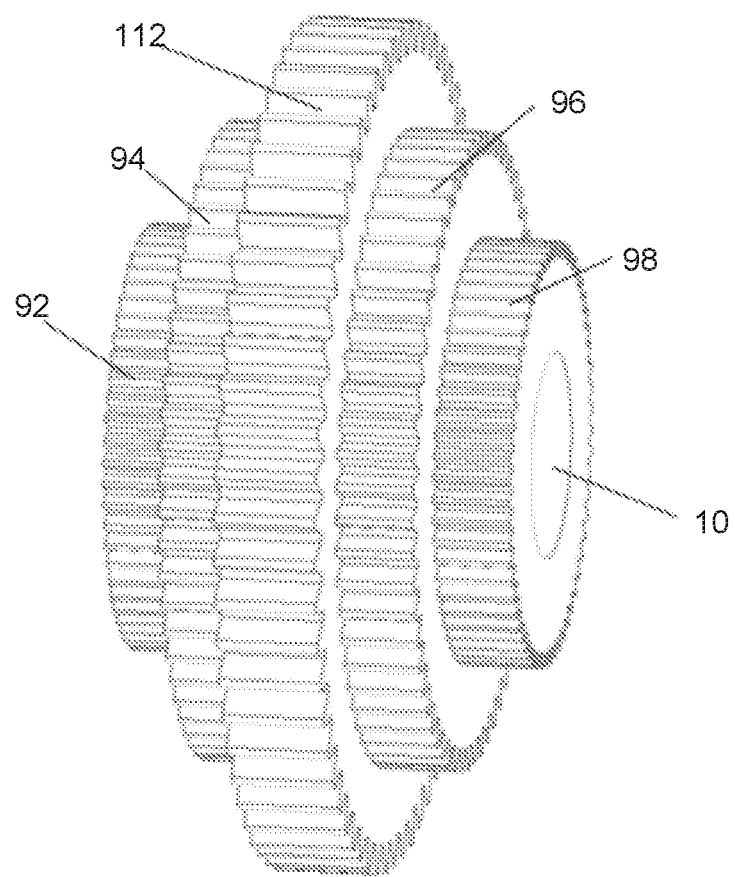

FIG. 4 illustrates that the gearbox device can have one or more sun gears and planet gears 18. The gearbox housing or frame 40 can have a radially outer portion or face that can encircle the sun gear(s) and planet gears 18 and be fixed to the gearbox frame first side 30 and/or gearbox frame second side 20. The housing radially outer portion 118 can be radially spaced from the outer planetary gears. The housing frame can have housing assembly screw holes 124 through which assembly screws can be attached to fix the housing radially outer portion 118 to the proximal plate and/or the distal plate of the housing.

The planetary gearbox can have an output flange 6 radially inside of the planet gears 18. The output flange 6 can be attached to the one or more output sun gears 146. The output flange can have one or more flange screw holes or mount-holes 126 that can be attached to and deliver output energy to an energy receiver, FIGS. 5*a*, 5*b*, 6*a*, 6*b* and 7 illustrate that the gearbox device can have a motor longitudinally within the gearbox housing 40, that can deliver input energy to the planetary gears 18.

The motor can have a stator 130 and rotor 134. The terminal radial outside surface of the stator 130 can have, be attached to, or form the housing radially outer portion 118 or face.

The rotor 134 can be radially inside of the stator 130. The motor can have bearings (e.g., ball bearings 62) between the stator 130 and rotor 134 and/or the planet gears 18 can act as bearings between the rotor 134 and the stator 130. For example, if the rotor 134 is fixed to the planet carrier 138, the motor can have no bearings positioned in the radial gap between the rotor 134 and the stator 130.

The radially inside and/or longitudinal sides of the rotor 134 can be fixedly attached or integrated with a proximal planet carrier 70 and/or a distal planet carrier 60. For example, one or both of the distal planet carriers 60 can be attached to (e.g. welded) or integrated with (e.g., cast) the rotor 134. The distal planet carrier 60 can be longitudinally spaced apart from the proximal planet carrier 70. The planet carriers 18 can be translatably fixed and rotatably 180 attached to the respective ends of the planet gear shafts or axles 66.

The gearbox device can have a proximal (fixed) sun gear 136 extending longitudinally inwardly from the gearbox housing/frame first side 30. The fixed sun gears 190 can be radially (with respect to the gearbox housing 40) inside the planet gears 18. The gearbox device can have a distal (fixed) sun gear 128 extending longitudinally inwardly from the gearbox housing/frame second side 20. The fixed sun gears 190 can be fixed to the gearbox housing/frame.

The gearbox device can have one or more output sun gears 146 radially (with respect to the gearbox housing 40) inside of the planet gears 18. The output sun gear 146 can be longitudinally between the proximal sun gear 136 and the distal sun gear 128. The output sun gear 146 can have an outer radius larger or smaller than the outer radii of the proximal 144 and distal sun gears 148. For example, the distal 148 and proximal sun gears 144 can have the same radii as each other.

The planet gear teeth 76, 86 can mesh, engage, or interface with the respective fixed sun gear teeth. For example, the planet gear distal teeth 42 can longitudinally coincide or overlap with the distal sun gear teeth, the planet gear middle or central teeth 142 can longitudinally coincide or overlap with the central(output) sun gear teeth, and the planet gear proximal teeth 56 can longitudinally coincide or overlap with the proximal sun gear teeth.

The gearbox device can have no ring gears. The gearbox device can have output bearings 150.

FIGS. 8*a* through 8*d* illustrate a sunless 2 gearbox device that can have planet gears 18 that can have multiple output ring gears 156, 158 that can concurrently deliver output energy at different rotational speeds and torques from each other through the single gearbox device.

For example, the gearbox device can have a fixed proximal 164 and distal ring gears 48. The distal 48 and proximal ring gears 54 can be translationally and rotationally fixed to the case, frame or chassis. The gearbox device can have a proximal output ring gear 162 and a distal output ring gear 166 that can be connected and deliver output energy to the same or different first energy receivers. The proximal 54 and distal output ring gears 48 can have the same or different inner radii. The gearbox device can have a middle output ring gear 68 that can be connected and deliver output energy to a second energy receiver different from the first energy receiver. During use, the middle output ring can rotate at a slower speed and deliver a higher output torque than the speed and torque of the proximal 54 and distal output ring gears 48.

The proximal engagement region 92 can be longitudinally symmetric about the planet gear's centerline plane and equal in outer radius to the distal engagement region 98 (as shown), or can have different outer radii and/or be asymmetric with each other about the planet gear's centerline plane. The proximal-middle engagement region 94 and the distal-middle engagement region 96 can be longitudinally symmetric about the planet gear's centerline plane, equal in outer radius to each other, and have a larger outer radius than the proximal and distal engagement regions 178 (as shown), or can have different outer radii and/or be asymmetric with each other about the planet gear's centerline plane and one or both can have a smaller outer radius than the proximal and/or distal engagement region 178. The middle engagement region 112 can have a larger (as shown) or smaller outer radius than the distal-middle 96 and/or proximal-middle engagement region 94.

FIG. 9a illustrates that when the sunless 2 gearbox device is in use, an input rotational torque can be applied to the planet carrier 138. The planet carrier 138 can rotate clockwise, as shown by planet carrier rotation arrow 182. The planet carrier 138 can be translationally fixed to the planet gears 18. The centers of the planet gears 18 can rotate clockwise (also shown by planet carrier rotation arrow 182) about the rotational center of the planet carrier 138. The rotational axis of the planet carrier 138 can be collinear with the center axis of the fixed ring gear 184 and/or output ring gear 176.

The planet gears 18 can rotate about each of the planet gear's longitudinal axes 80, as shown by planet gear rotation arrow 180. For example, when the input rotational torque is transferred through the planet carrier 138 to the planet gears 18 and causes the planet gears 18 to rotate with the planet carrier rotation 182, the fixed ring gear interface 174 (between the planet gears 18 and the fixed ring gear 184) can apply from the fixed ring gear 184 to the planet gears 18 a force opposing the planet gears' motion. This force can cause the planet gear rotation 180.

The planet gears 18 can transfer the input rotational torque to the output ring gear 176. The planet gear rotation 180 of the planet gears 18 can rotate the output ring gear by transferring a force at the output ring gear interface 172. The output ring gear 176 can then deliver the transferred force as an output torque and energy to an energy receiver.

FIG. 9b illustrates that when the ringless 120 gearbox device is in use, an input rotational torque can be applied to the planet carrier 138. The planet carrier 138 can rotate clockwise, as shown by planet carrier rotation arrow 182. The planet carrier 138 can be translationally fixed to the planet gears 18. The centers of the planet gears 18 can rotate clockwise (also shown by planet carrier rotation arrow 182) about the rotational center of the planet carrier 138. The rotational axis of the planet carrier 138 can be collinear with the center axis of the fixed sun gear 190 and/or output sun gear 146.

The planet gears 18 can rotate about each of the planet gear's longitudinal axes 80, as shown by planet gear rotation arrow 180. For example, when the input rotational torque is transferred through the planet carrier 138 to the planet gears 18 and causes the planet gears 18 to rotate with the planet carrier rotation 182, the fixed sun gear interface 186 (between the planet gears and the fixed sun gear 190) can apply from the fixed sun gear 190 to the planet gears 18 a force opposing the planet gears' motion. This force can cause the planet gear rotation 180.

The planet gears 18 can transfer the input rotational torque to the output sun gear 146. The planet gear rotation 180 of the planet gears 18 can rotate the output sun gear 146 by transferring a force at the output sun gear interface 188. The output sun gear 146 can then deliver the transferred force as an output torque and energy to an energy receiver.

The output flanges 6 can be fixedly attached to clutches (e.g., to a compact automatic or manual transmission) and/or other power receiving elements.

The planet gears 18, ring gears 184, and sun gears can have teeth (as shown) 102, can be toothless friction gears, magnetic-drive gears, or combinations thereof. For example, the gearbox can have longitudinally alternate between toothed and friction-drive gears and/or sections (e.g., having a toothed proximal sun gear 144, a toothless friction output (middle) sun gear 132, and a toothed distal sun gear 148, and planet gear 18 with proximal teeth 56, distal teeth 42, and a middle toothless friction-drive section 58), and/or magnetic-drive gears and/or sections.

Magnetic drive sections can be toothed, friction drive, or neither. For example, the respective gears can have permanent and/or electromagnets (e.g., that can be turned off and on during use to activate and deactivate gears, for example to act as clutches for the respective output flange 6) that can attract or repel each other to transmit forces between gears. For example, the magnets on the proximal sun gear 144 can transmit forces to the magnets in the proximal section of the planet gears 18. With the respectively connected gears and sections (e.g., the proximal sun gear 144 and the planet gear 18 proximal section) not being mechanically attached to each other, the magnetic respective interactions can reduce transmission of high impact or shock forces (i.e., acting as a mechanical damper or shock absorber.

Except for magnets or electrically conductive elements, any or all of the elements of the gearbox system disclosed herein can be made from metals, plastics (including resins), composites (e.g., resin and carbon fiber composites, metal matrix composites (e.g., carbon fiber reinforced aluminum), metal alloys), or combinations thereof. Permanent magnets can be made from permanent magnetic or ferromagnetic material. Electrically conductive elements (e.g., electromagnets) can be made from metals, electrically active plastics, conductive elastomers, or combinations thereof.

Any or all of the elements of the gearbox system disclosed herein can be made by injection molding, casting, three-dimensional printing, grinding, polishing, or combinations thereof.

Any and all references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this disclosure can be made without departing from its spirit and scope, as will be apparent to those skilled in the art.

The specific variations described herein are offered by way of example only. The elements disclosed herein can be combined with each other in other variations than the specific variations disclosed herein. Any element described herein as being sole or singular can also be plural or multiple, and any element described herein as plural or multiple can also be sole or singular.

I claim:

1. A gearbox device comprising:
a planetary gear having a first tooth and a second tooth, wherein the first tooth and the second tooth are on the radial outside of the planetary gear, and wherein the first tooth has a larger radius from a planetary gear rotational center than the second tooth, and wherein a diameter of the first tooth decreases along a transverse direction, and wherein the planetary gear further comprises a third tooth that has a third top land, and wherein the third top land has a decreasing radius from the planetary gear rotational center along the length of the third tooth.

2. The device of claim 1, wherein the first tooth is on a first longitudinal side of the second tooth, and wherein the third tooth is on a second longitudinal side of the second tooth, and wherein the third tooth has a radius from the rotational center of the planetary gear that is less than the radius of the second tooth from the rotational center of the planetary gear.

3. The device of claim 1, wherein the third tooth has a radius from the rotational center of the planetary gear that is equal to the radius of the first tooth from the rotational center of the planetary gear.

4. A gearbox device comprising:
a planetary gear having a first tooth and a second tooth, wherein the first tooth and the second tooth are on the radial outside of the planetary gear, and wherein the first tooth has a larger radius from a planetary gear rotational center than the second tooth, and wherein a diameter of the first tooth decreases along a transverse direction, and wherein the planetary gear comprises a magnet.

5. The device of claim 4, wherein the magnet comprises an electro-magnet.

6. The device of claim 4, wherein the magnet comprises a permanent magnet.

7. A gearbox device comprising:
a planetary gear having a first tooth and a second tooth, wherein the first tooth and the second tooth are on the radial outside of the planetary gear, and wherein the first tooth has a larger radius from a planetary gear rotational center than the second tooth, and wherein a diameter of the first tooth decreases along a transverse direction, and wherein the planetary gear comprises a toothless friction surface.

8. A gearbox device comprising:
a planetary gear having a first tooth and a second tooth, wherein the first tooth and the second tooth are on the radial outside of the planetary gear, and wherein the first tooth has a larger radius from a planetary gear rotational center than the second tooth, and wherein a diameter of the first tooth decreases along a transverse direction, and wherein the device has no sun gear.

* * * * *